United States Patent
Hotta et al.

(10) Patent No.: US 10,047,689 B2
(45) Date of Patent: Aug. 14, 2018

(54) EXHAUST GAS PURIFICATION SYSTEM OF INTERNAL COMBUSTION ENGINE

(71) Applicants: Shintaro Hotta, Shizuoka-ken (JP); Yasuyuki Irisawa, Shizuoka-ken (JP)

(72) Inventors: Shintaro Hotta, Shizuoka-ken (JP); Yasuyuki Irisawa, Shizuoka-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 24 days.

(21) Appl. No.: 14/902,133

(22) PCT Filed: Jul. 4, 2013

(86) PCT No.: PCT/JP2013/068405
§ 371 (c)(1),
(2) Date: Dec. 30, 2015

(87) PCT Pub. No.: WO2015/001647
PCT Pub. Date: Jan. 8, 2015

(65) Prior Publication Data
US 2016/0222896 A1    Aug. 4, 2016

(51) Int. Cl.
*F01N 13/00* (2010.01)
*F01N 3/08* (2006.01)
(Continued)

(52) U.S. Cl.
CPC ....... *F02D 41/0052* (2013.01); *F01N 3/0814* (2013.01); *F01N 3/0842* (2013.01);
(Continued)

(58) Field of Classification Search
CPC .... F01N 13/009; F01N 3/0814; F01N 3/0842; F01N 3/101; F01N 3/208; F01N 2430/06;
(Continued)

(56) References Cited

U.S. PATENT DOCUMENTS

2004/0076565 A1\* 4/2004 Gandhi .............. B01D 53/8631
423/235
2006/0251548 A1\* 11/2006 Willey .................. F01N 3/0222
422/180

(Continued)

FOREIGN PATENT DOCUMENTS

EP          2634408 A1    9/2013
JP       H03-87915 U      9/1991
(Continued)

OTHER PUBLICATIONS

Machine Translation of JP 2008231950.\*

*Primary Examiner* — Brandon Lee
(74) *Attorney, Agent, or Firm* — Hunton Andrews Kurth LLP

(57) ABSTRACT

An exhaust gas purification system of an internal combustion engine according to the present invention includes: processing means for executing at least one of a process of increasing an air-fuel ratio of an air-fuel mixture burned in the internal combustion engine and a process of increasing EGR gas recirculated by an EGR apparatus, when increasing a $NO_2$ proportion in exhaust gas; and control means for controlling the processing means so that an increase in the air-fuel ratio becomes larger, and an increase in the EGR gas becomes smaller when a temperature of the exhaust gas purification apparatus is high as compared to when the temperature of the exhaust gas purification apparatus is low.

4 Claims, 6 Drawing Sheets

(51) Int. Cl.
| | | |
|---|---|---|
| *F01N 3/10* | (2006.01) | |
| *F01N 3/20* | (2006.01) | |
| *F02D 41/00* | (2006.01) | |
| *F02D 41/02* | (2006.01) | |
| F02D 41/10 | (2006.01) | |
| F02M 26/05 | (2016.01) | |
| F02M 26/49 | (2016.01) | |

(52) U.S. Cl.
CPC ............ *F01N 3/101* (2013.01); *F01N 3/208* (2013.01); *F01N 13/009* (2014.06); *F02D 41/0245* (2013.01); F01N 3/2066 (2013.01); F01N 2430/06 (2013.01); F01N 2560/06 (2013.01); F01N 2570/14 (2013.01); F01N 2610/03 (2013.01); F01N 2900/1602 (2013.01); F02D 41/107 (2013.01); F02D 2041/0265 (2013.01); F02D 2200/0802 (2013.01); F02M 26/05 (2016.02); F02M 26/49 (2016.02); Y02T 10/22 (2013.01); Y02T 10/24 (2013.01); Y02T 10/26 (2013.01); Y02T 10/47 (2013.01)

(58) Field of Classification Search
CPC ............ F01N 2560/06; F01N 2570/14; F01N 2610/03; F01N 2900/1602; F01N 3/2066; F02D 41/0052; F02D 41/0245; F02D 2041/0265; F02D 2200/0802; F02D 41/107; F02M 26/05; F02M 26/49; Y02T 10/22; Y02T 10/24; Y02T 10/26; Y02T 10/47

See application file for complete search history.

(56) References Cited

U.S. PATENT DOCUMENTS

| | | | |
|---|---|---|---|
| 2010/0098609 A1* | 4/2010 | Colliou | ................ F01N 3/2053 423/213.2 |
| 2011/0308235 A1 | 12/2011 | Bisaiji | |
| 2012/0117954 A1 | 5/2012 | Yasui et al. | |
| 2012/0118275 A1* | 5/2012 | Kang | ................ F02D 41/0062 123/568.11 |

FOREIGN PATENT DOCUMENTS

| | | | | |
|---|---|---|---|---|
| JP | 2000-064877 A | | 2/2000 | |
| JP | 2000-110615 A | | 4/2000 | |
| JP | 2008-231950 A | | 10/2008 | |
| JP | 2008231950 A | * | 10/2008 | ............ F01N 3/035 |
| JP | 2009-097471 A | | 5/2009 | |
| JP | 2009-264285 A | | 11/2009 | |
| JP | 2012-154231 A | | 8/2012 | |
| JP | 2012-167549 A | | 9/2012 | |
| WO | 2008 114834 A1 | | 9/2008 | |
| WO | 2011/027469 A1 | | 3/2011 | |

\* cited by examiner

[Fig. 1]
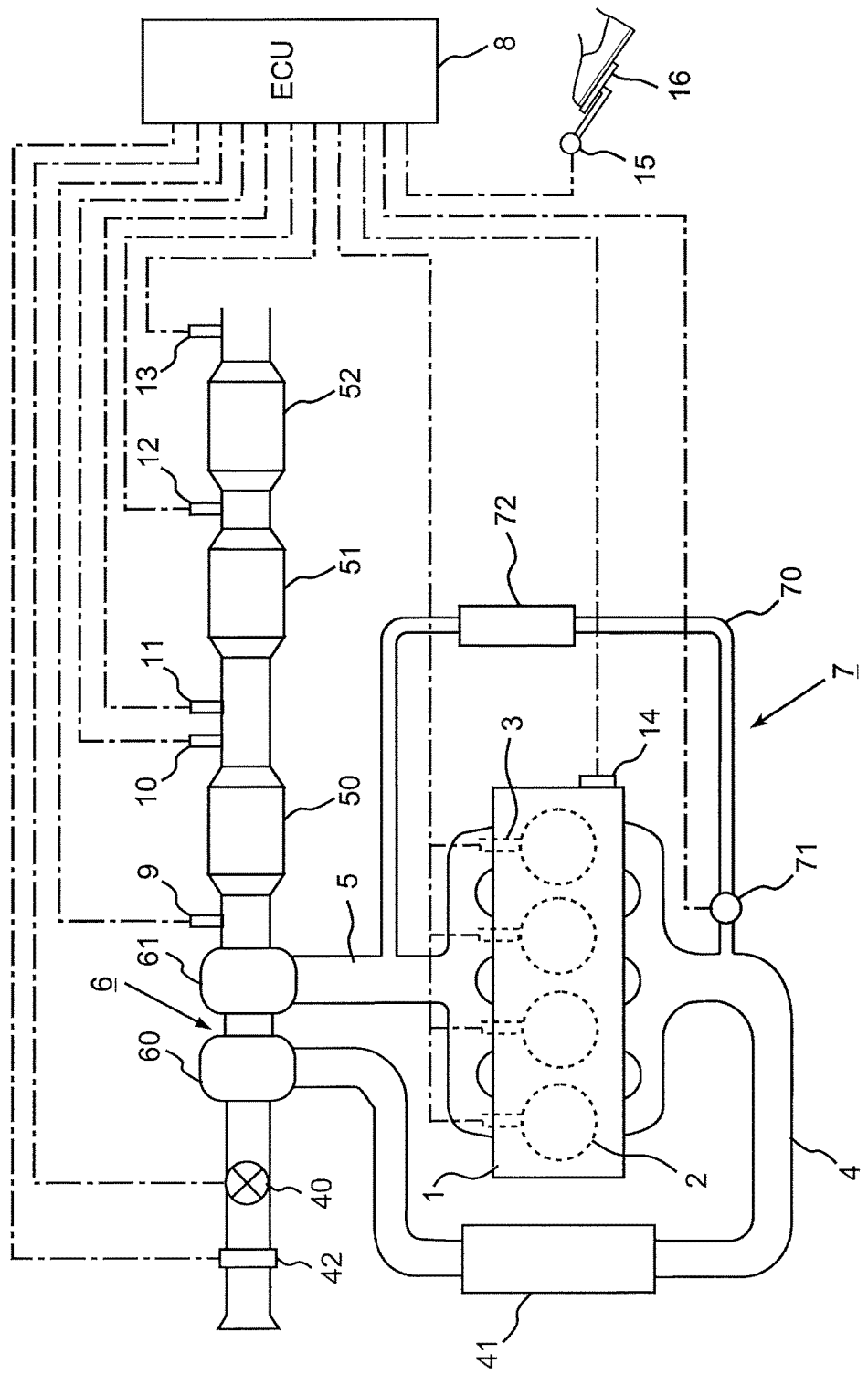

[Fig. 2]
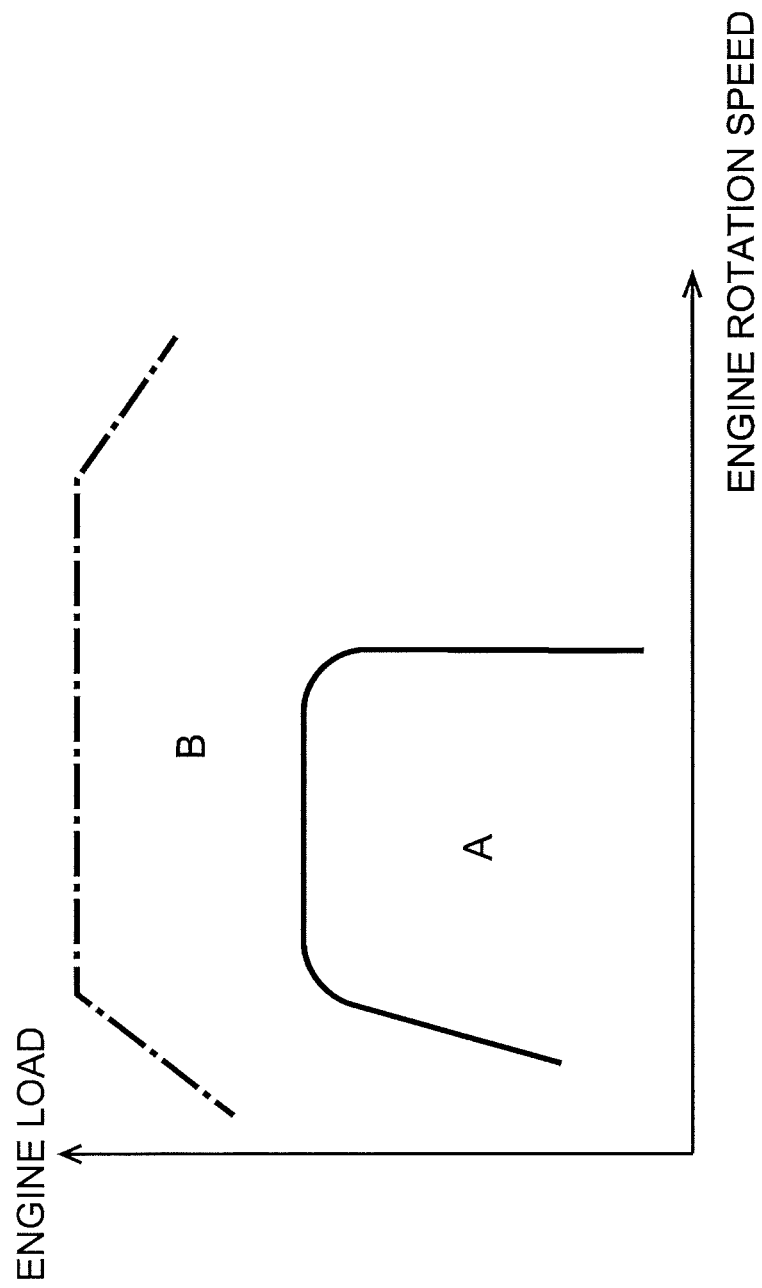

[Fig. 3]
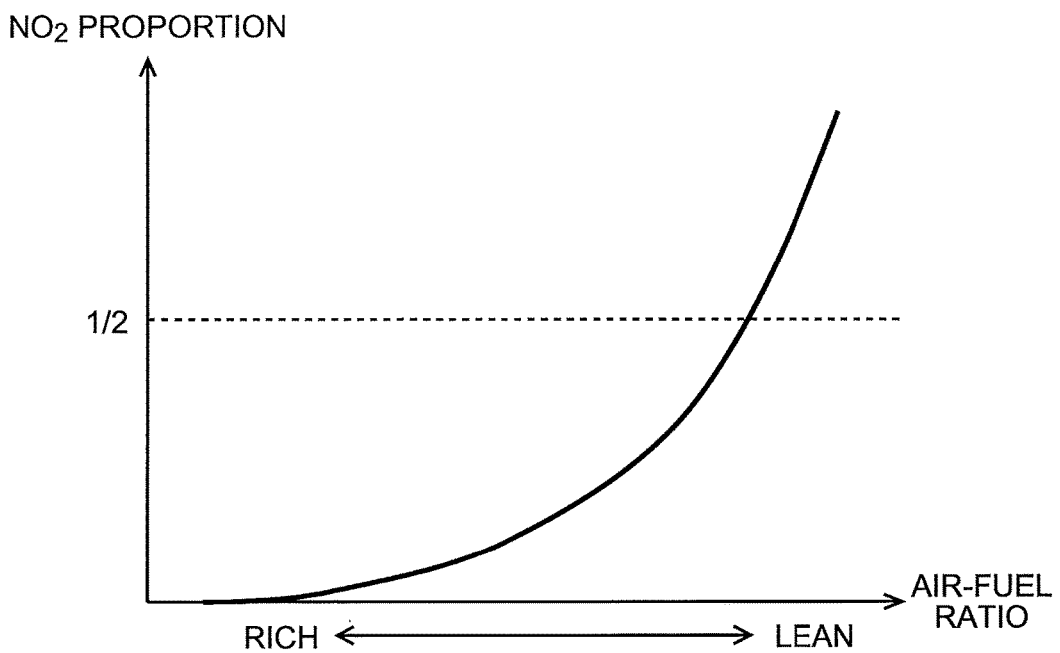
[FIG. 4]
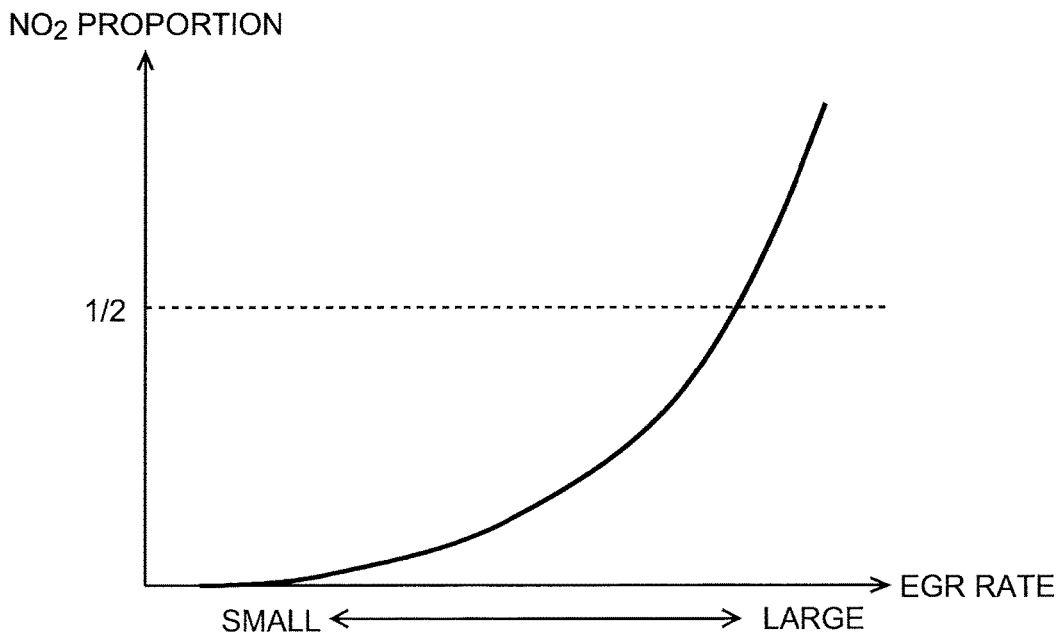

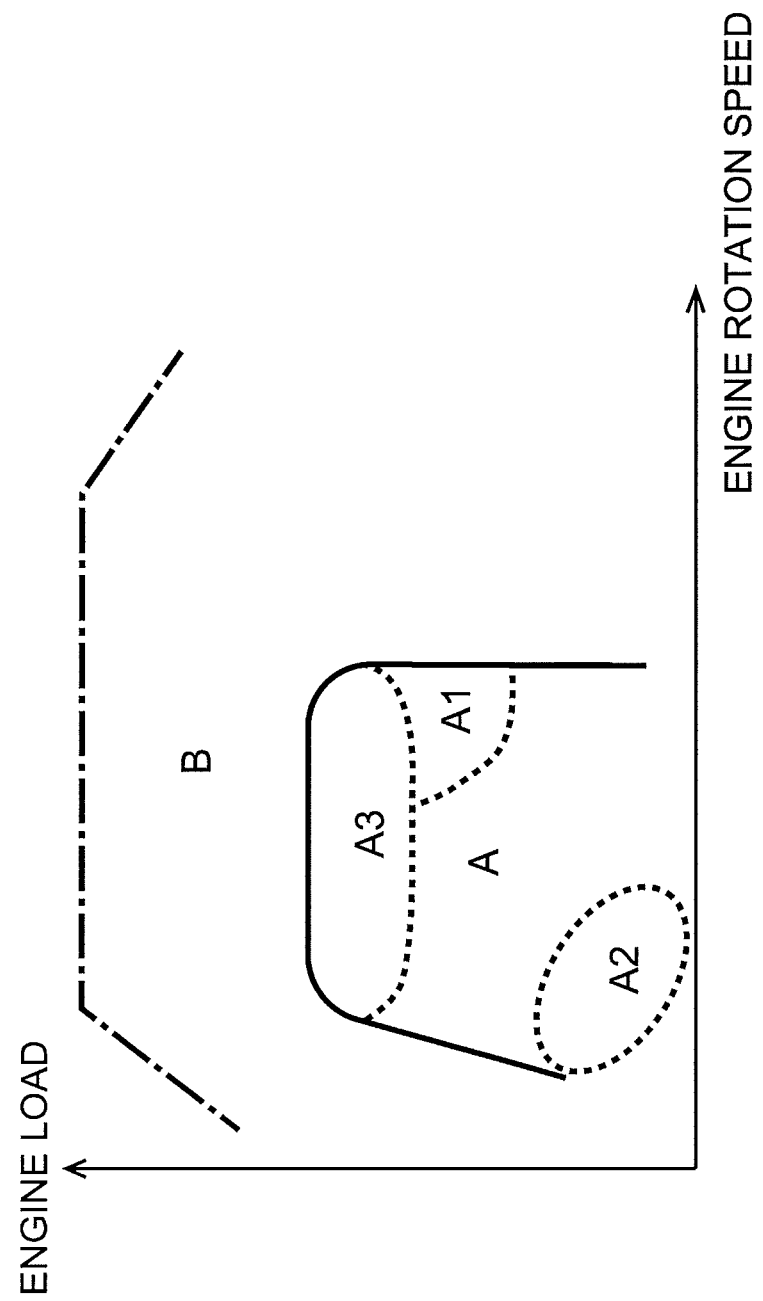
[Fig. 5]

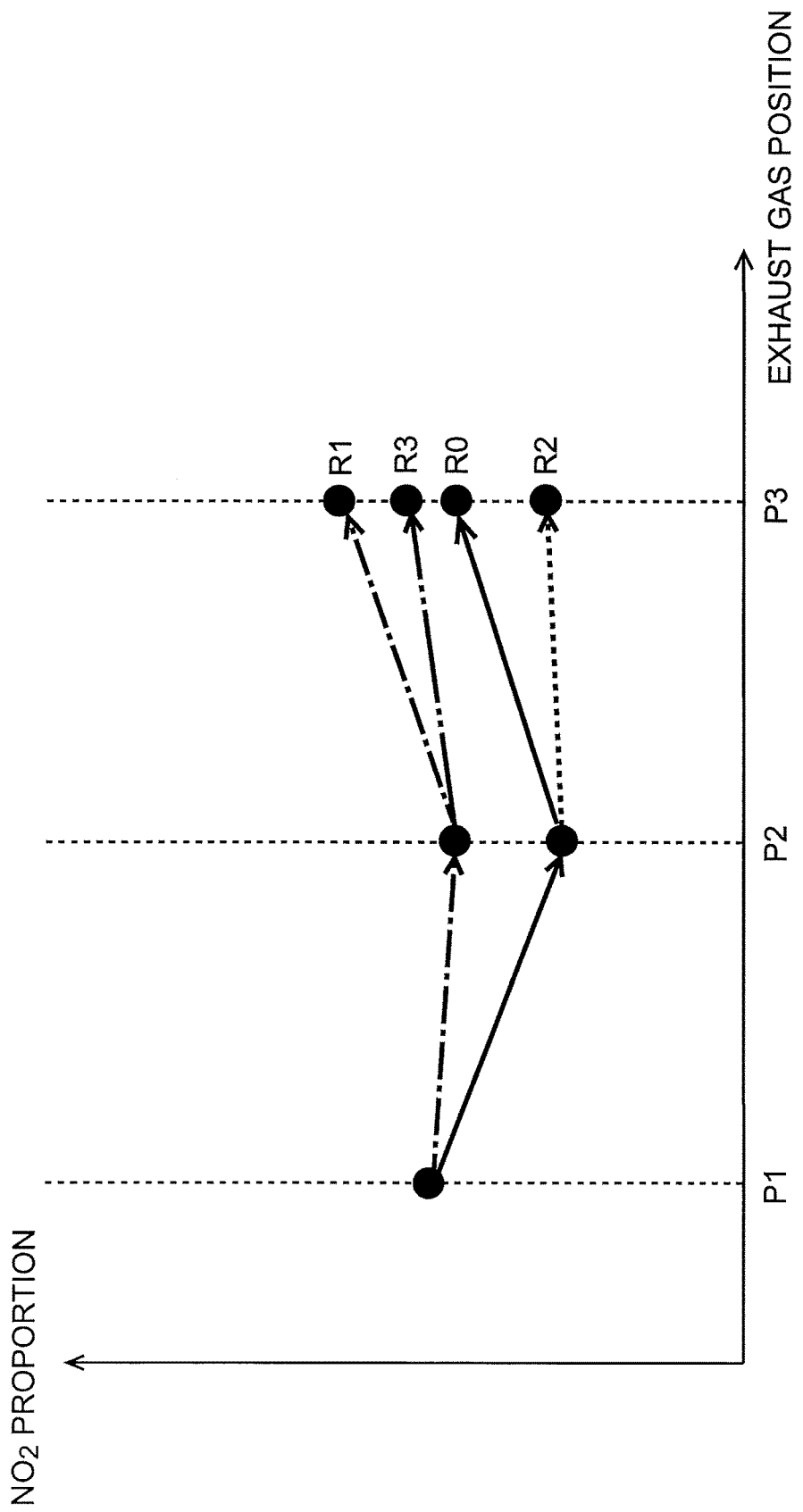
[Fig. 6]

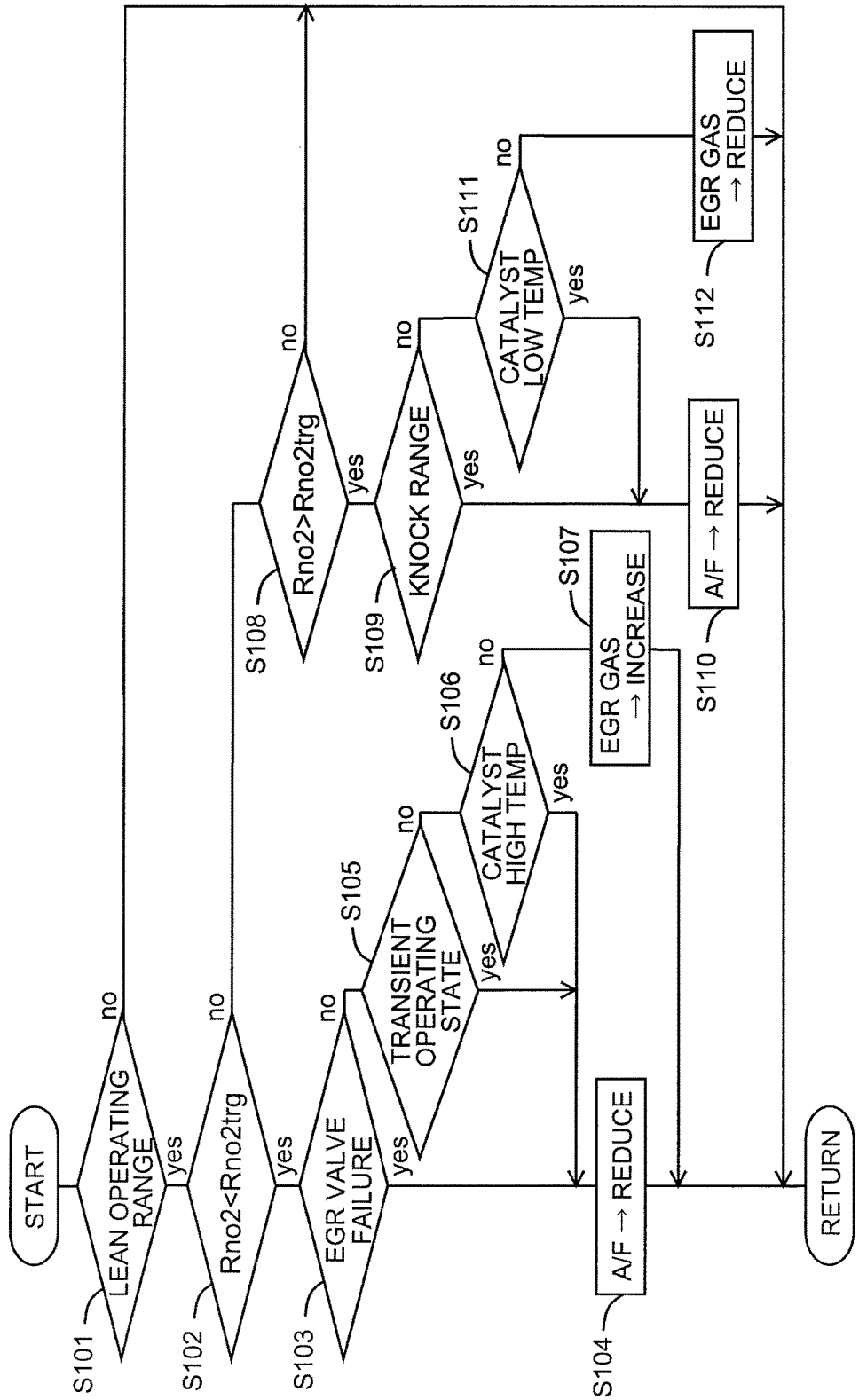
[Fig. 7]

US 10,047,689 B2

EXHAUST GAS PURIFICATION SYSTEM OF INTERNAL COMBUSTION ENGINE

CROSS-REFERENCE TO RELATED APPLICATION

This is a national phase application based on the PCT International Patent Application No. PCT/JP2013/068405 filed Jul. 4, 2013, the entire contents of which are incorporated herein by reference.

TECHNICAL FIELD

The present invention relates to an exhaust gas purification system of an internal combustion engine.

BACKGROUND ART

Patent Document 1 describes a technique in which, when a proportion of nitrogen dioxide ($NO_2$) in nitrogen oxides (NOx) contained in exhaust gas (hereinafter, referred to as a "$NO_2$ proportion") is greater than a desired proportion in a configuration in which an exhaust gas purification apparatus including a selective catalytic reduction catalyst (SCR catalyst) is arranged in an exhaust passage of an internal combustion engine, the $NO_2$ proportion is reduced by reducing an amount of exhaust gas recirculation (EGR) gas.

Patent Document 2 describes that a $NO_2$ proportion in exhaust gas increases when an air-fuel ratio of an air-fuel mixture burned in a cylinder of an internal combustion engine is high (lean) as compared to when the air-fuel ratio is low (rich).

Patent Document 3 describes a technique for controlling any one of or both an EGR rate and a fuel injection timing so as to set a $NO_2$ proportion to approximately ½ (50 percent) in a configuration in which an exhaust gas purification apparatus including an SCR catalyst is arranged in an exhaust passage of an internal combustion engine.

PRIOR ART REFERENCES

Patent Documents

Patent Document 1: Japanese Patent Application Laid-open No. 2012-167549
Patent Document 2: Japanese Utility Model Application Laid-open No. H03-87915
Patent Document 3: Japanese Patent Application Laid-open No. 2008-231950

SUMMARY OF THE INVENTION

Problems to be Solved by the Invention

If an air-fuel ratio of an air-fuel mixture or an amount of EGR gas is inadvertently changed when adjusting a $NO_2$ proportion, fuel consumption of an internal combustion engine may increase or purification performance of an exhaust gas purification apparatus may decline.

The present invention has been made in consideration of the circumstances described above and an object thereof is to provide a technique which, in an exhaust gas purification system in which an exhaust gas purification apparatus including an SCR catalyst is arranged in an exhaust passage of an internal combustion engine, enables a $NO_2$ proportion to be adjusted while preventing adverse effects on an operating state of the internal combustion engine, purification performance of the exhaust gas purification apparatus, and the like.

Means for Solving the Problems

In order to solve the problem described above, the present invention provides an exhaust gas purification system of an internal combustion engine, the exhaust gas purification system including an exhaust gas purification apparatus which is arranged in an exhaust passage of the internal combustion engine and which includes an SCR catalyst and an EGR apparatus which recirculates a part of exhaust gas (EGR gas) from the exhaust passage to an intake passage of the internal combustion engine, wherein a $NO_2$ proportion is adjusted using a method suitable for an operating state of the internal combustion engine or a state of the exhaust gas purification apparatus.

Specifically, a first aspect of an exhaust gas purification system of an internal combustion engine according to the present invention includes:

an exhaust gas purification apparatus which is arranged in an exhaust passage of the internal combustion engine and which includes a selective catalytic reduction catalyst (SCR catalyst);

an EGR apparatus which recirculates a part of exhaust gas flowing through the exhaust passage as EGR gas;

processing means for executing, when increasing a $NO_2$ proportion that is a proportion of nitrogen dioxide in NOx contained in the exhaust gas, at least one of a process of increasing an air-fuel ratio of an air-fuel mixture burned in the internal combustion engine and a process of increasing EGR gas recirculated by the EGR apparatus; and control means for controlling the processing means so that an increase in the air-fuel ratio becomes larger and an increase in the EGR gas becomes smaller when a temperature of the exhaust gas purification apparatus is high as compared to when the temperature of the exhaust gas purification apparatus is low.

When an air-fuel ratio of an air-fuel mixture is high (when fuel concentration of the air-fuel mixture is low), a $NO_2$ proportion of exhaust gas discharged from the internal combustion engine increases as compared to when the air-fuel ratio of the air-fuel mixture is low (when the fuel concentration of the air-fuel mixture is high). In addition, when an amount of EGR gas is large or when an EGR rate is high, the $NO_2$ proportion of exhaust gas discharged from the internal combustion engine increases as compared to when the amount of EGR gas is small or when the EGR rate is low.

When an amount of EGR gas is large or when an EGR rate is high, a temperature of the exhaust gas discharged from the internal combustion engine is more likely to rise as compared to when the amount of EGR gas is small or when the EGR rate is low. Therefore, in a state where the temperature of the exhaust gas purification apparatus is high, when the EGR gas or the EGR rate increases, the temperature of the exhaust gas purification apparatus may deviate from an active temperature range (a temperature purification window). As a result, purification performance of the exhaust gas purification apparatus may decline and cause emission to deteriorate.

In contrast, when the air-fuel ratio of the air-fuel mixture is high, the temperature of the exhaust gas discharged from the internal combustion engine drops as compared to when the air-fuel ratio of the air-fuel mixture is low. As a result, when the air-fuel ratio is increased (when the fuel concentration in the air-fuel mixture is lowered) in a state where the temperature of the exhaust gas purification apparatus is high, a $NO_2$ proportion can be increased while preventing the temperature of the exhaust gas purification apparatus from rising.

Therefore, when the temperature of the exhaust gas purification apparatus is high, making an increase in the air-fuel ratio larger and making an increase in EGR gas (or EGR rate) smaller enables the $NO_2$ proportion to be increased while reducing a rise in the temperature of the exhaust gas purification apparatus as compared to when the temperature of the exhaust gas purification apparatus is low. As a result, purification performance of the exhaust gas purification apparatus is improved.

Moreover, an aspect of "making an increase in the air-fuel ratio larger and making an increase in EGR gas smaller" includes an aspect in which the air-fuel ratio is increased without increasing EGR gas, an aspect in which EGR gas is reduced and the air-fuel ratio is increased, and an aspect in which EGR gas is slightly increased and the air-fuel ratio is increased. These three aspects may be selectively used in accordance with the temperature of the exhaust gas purification apparatus.

For example, when the temperature of the exhaust gas purification apparatus exceeds an upper limited value of a temperature purification window, the air-fuel ratio of the air-fuel mixture may be increased while reducing EGR gas. In this case, a $NO_2$ proportion can be increased while lowering the temperature of the exhaust gas purification apparatus. In addition, when the temperature of the exhaust gas purification apparatus is equal to or lower than the upper limited value of the temperature purification window and a difference between the temperature of the exhaust gas purification apparatus and the upper limited value is relatively small, the air-fuel ratio of the air-fuel mixture may be increased without increasing EGR gas. In this case, a $NO_2$ proportion can be increased while preventing the temperature of the exhaust gas purification apparatus from rising. Furthermore, when the temperature of the exhaust gas purification apparatus is equal to or lower than the upper limited value of the temperature purification window and a difference between the temperature of the exhaust gas purification apparatus and the upper limited value is relatively large, the air-fuel ratio of the air-fuel mixture may be increased while slightly increasing EGR gas. In this case, a $NO_2$ proportion can be increased while preventing the temperature of the exhaust gas purification apparatus from rising excessively. In addition, an effect of reducing an amount of generated NOx, an effect of preventing knocking, and the like due to the increase in EGR gas can be produced.

Moreover, when the temperature of the exhaust gas purification apparatus is lower than a lower limited value of the temperature purification window, the control means may control the processing means so that an increase in the air-fuel ratio becomes smaller and an increase in EGR gas becomes larger. In this case, a $NO_2$ proportion can be increased while raising the temperature of the exhaust gas purification apparatus.

Next, a second aspect of the exhaust gas purification system of an internal combustion engine according to the present invention includes:

an exhaust gas purification apparatus which is arranged in an exhaust passage of the internal combustion engine and which includes a selective catalytic reduction catalyst (SCR catalyst);

an EGR apparatus which recirculates a part of exhaust gas flowing through the exhaust passage as EGR gas;

processing means for executing, when increasing a $NO_2$ proportion that is a proportion of nitrogen dioxide in NOx contained in the exhaust gas, at least one of a process of increasing an air-fuel ratio of an air-fuel mixture burned in the internal combustion engine and a process of increasing EGR gas recirculated by the EGR apparatus; and control means for controlling the processing means so that, when the internal combustion engine is in a transient operating state, at least the air-fuel ratio of the air-fuel mixture is increased and, at the same time, an increase in the air-fuel ratio becomes larger as compared to when the internal combustion engine is not in a transient operating state.

A period of time until a process of increasing EGR gas is reflected in a $NO_2$ proportion is longer than a period of time until a process of increasing the air-fuel ratio of the air-fuel mixture is reflected in the $NO_2$ proportion. Therefore, if an attempt is made to increase the $NO_2$ proportion by a process of increasing EGR gas when the internal combustion engine is in a transient operating state, the $NO_2$ proportion may not assume a proportion suitable for the transient operating state of the internal combustion engine. In contrast, if an attempt is made to increase the $NO_2$ proportion by a process of increasing the air-fuel ratio of the air-fuel mixture when the internal combustion engine is in a transient operating state, the $NO_2$ proportion increases promptly. Therefore, the $NO_2$ proportion can be set to a proportion suitable for the transient operating state of the internal combustion engine.

Moreover, when an increase in the air-fuel ratio is made large, torque fluctuation of the internal combustion engine may increase. However, when the internal combustion engine is in a transient operating state, torque fluctuation that is permissible by a driver conceivably increases as compared to when internal combustion engine is not in a transient operating state. Therefore, the $NO_2$ proportion can be changed while reducing a sense of discomfort that is felt by the driver.

In the first aspect or the second aspect described above, the exhaust gas purification apparatus may include a three-way catalyst arranged on an upstream side of the SCR catalyst. When a three-way catalyst is arranged on the upstream side of the SCR catalyst, $NO_2$ in the exhaust gas is reduced to nitrogen monoxide (NO) by the three-way catalyst. However, when purification performance of the three-way catalyst is low (for example, when a temperature of the three-way catalyst deviates from a temperature purification window, when a flow rate of exhaust gas passing through the three-way catalyst is high, or when the three-way catalyst has deteriorated), an amount of $NO_2$ reduced by the three-way catalyst becomes smaller. As a result, a $NO_2$ proportion of exhaust gas flowing into the SCR catalyst increases.

In consideration thereof, when the purification performance of the three-way catalyst is low, the control means may control the processing means so that an increase in a $NO_2$ proportion becomes smaller as compared to when the purification performance of the three-way catalyst is high. By performing such control, the $NO_2$ proportion of exhaust gas flowing into the SCR catalyst is prevented from becoming excessively high when the purification performance of the three-way catalyst is low.

In addition, in the first aspect or the second aspect described above, the exhaust gas purification apparatus may include a NOx storage reduction catalyst (NSR catalyst) arranged on an upstream side of the SCR catalyst. When an NSR catalyst is arranged on the upstream side of the SCR catalyst, NO in the exhaust gas is oxidized to $NO_2$ by the NSR catalyst. However, when purification performance of the NSR catalyst is low (for example, when a temperature of the NSR catalyst deviates from a temperature purification window, when a flow rate of exhaust gas passing through the NSR catalyst is high, or when the NSR catalyst has deteriorated), an amount of NO oxidized by the NSR catalyst becomes smaller. As a result, a $NO_2$ proportion of exhaust gas flowing into the SCR catalyst decreases.

In consideration thereof, when the purification performance of the NSR catalyst is low, the control means may control the processing means so that an increase in a $NO_2$ proportion becomes larger as compared to when the purification performance of the NSR catalyst is high. By performing such control, the $NO_2$ proportion of exhaust gas flowing into the SCR catalyst is prevented from becoming excessively low when the purification performance of the NSR catalyst is low.

Moreover, the exhaust gas purification apparatus may include an NSR catalyst arranged on an upstream side of the SCR catalyst and a three-way catalyst arranged on an upstream side of the NSR catalyst. In this case, the control means may adjust an increase in a $NO_2$ proportion in accordance with purification performance of the three-way catalyst and purification performance of the NSR catalyst.

For example, when the purification performance of the three-way catalyst is low and the purification performance of the NSR catalyst is appropriate, the control means may control the processing means so that an increase in the $NO_2$ proportion becomes smaller as compared to when the purification performance of the three-way catalyst and the purification performance of the NSR catalyst are appropriate. When the purification performance of the three-way catalyst is appropriate and the purification performance of the NSR catalyst is low, the control means may control the processing means so that an increase in the $NO_2$ proportion becomes larger as compared to when the purification performance of the three-way catalyst and the purification performance of the NSR catalyst are appropriate. When the purification performances of the three-way catalyst and the NSR catalyst are low, the control means may adjust an increase in the $NO_2$ proportion in accordance with degrees of decline of the purification performances of the respective catalysts.

Moreover, with a spark ignition internal combustion engine, when an amount of EGR gas is large or when an EGR rate is high, there is a tendency that knocking is less likely to occur as compared to when the amount of EGR gas is small or when the EGR rate is low. Therefore, when EGR gas or the EGR rate is reduced in a state where knocking readily occurs, knocking may occur even more readily.

In consideration thereof, when an operating state of the internal combustion engine is an operating state where knocking is likely to occur, if an increase in a $NO_2$ proportion must be made smaller due to a decline in the purification performance of the three-way catalyst or the like, the $NO_2$ proportion may be adjusted by adjusting an air-fuel ratio without reducing an amount of EGR gas. In addition, the $NO_2$ proportion may be adjusted by adjusting an air-fuel ratio while slightly reducing the amount of EGR gas. Furthermore, the $NO_2$ proportion may be adjusted by adjusting an air-fuel ratio while increasing the amount of EGR gas. According to these methods, the $NO_2$ proportion can be set to a desired proportion while preventing the occurrence of knocking.

Moreover, in the first aspect and the second aspect described above, the EGR apparatus may be an apparatus including an EGR passage that connects the exhaust passage and the intake passage to each other and an EGR valve or the like that changes a passage sectional area of the EGR passage or may be a variable valve mechanism capable of adjusting an amount of burnt gas (internal EGR gas) remaining in the cylinder by changing at least one of opening and closing timings of an intake valve and opening and closing timings of an exhaust valve.

Effect of the Invention

According to the present invention, in an exhaust gas purification system in which an exhaust gas purification apparatus including an SCR catalyst is arranged in an exhaust passage of an internal combustion engine, a $NO_2$ proportion can be adjusted while preventing adverse effects on an operating state of the internal combustion engine, purification performance of the exhaust gas purification apparatus, and the like.

BRIEF DESCRIPTION OF THE DRAWINGS

FIG. 1 is a diagram showing a schematic configuration of an internal combustion engine and an intake and exhaust system thereof to which the present invention is applied.

FIG. 2 is a diagram showing a lean operating range and a stoichiometric operating range of an internal combustion engine.

FIG. 3 is a diagram showing a correlation between an air-fuel ratio of an air-fuel mixture and a $NO_2$ proportion.

FIG. 4 is a diagram showing a correlation between an EGR rate and a $NO_2$ proportion.

FIG. 5 is a diagram showing operating ranges in accordance with methods of executing a $NO_2$ proportion adjustment process.

FIG. 6 is a diagram showing a correlation between a position of exhaust gas and a $NO_2$ proportion.

FIG. 7 is a flow chart showing a processing routine executed by an ECU when a $NO_2$ proportion adjustment process is executed.

MODES FOR CARRYING OUT THE INVENTION

Hereinafter, specific embodiments of the present invention will be described with reference to the drawings. It is to be understood that dimensions, materials, shapes, relative arrangements, and the like of components described in the present embodiment are not intended to limit the technical scope of the invention thereto unless otherwise noted.

FIG. 1 is a diagram showing a schematic configuration of an internal combustion engine and an intake and exhaust system thereof to which the present invention is applied. An internal combustion engine 1 shown in FIG. 1 is a four-stroke cycle spark ignition internal combustion engine (gasoline engine) that performs a lean combustion operation.

The internal combustion engine 1 includes a plurality of cylinders 2. Moreover, while the internal combustion engine 1 is shown in FIG. 1 to have four cylinders 2, the number of cylinders 2 may be 3 or less or 5 or more. The internal combustion engine 1 includes a fuel injection valve 3 for supplying fuel to each cylinder 2. The fuel injection valve 3 may be a valve apparatus that injects fuel into the cylinders 2 or may be a valve apparatus that injects fuel into an intake port.

The internal combustion engine 1 is connected to an intake pipe 4. The intake pipe 4 is a pipe for guiding fresh air (air) taken in from atmospheric air to the internal combustion engine 1. An intake throttle valve 40 is arranged midway along the intake pipe 4. The intake throttle valve 40 adjusts an amount of air flowing in the intake pipe 4 by changing a passage sectional area inside the intake pipe 4. A compressor 60 of a centrifugal supercharger (turbocharger) 6 is arranged in the intake pipe 4 on a downstream side of the intake throttle valve 40. The compressor 60 compresses intake air using rotational energy of a turbine 61 to be described later. An intercooler 41 is arranged in the intake pipe 4 on a downstream side of the compressor 60. The intercooler 41 performs heat exchange between atmospheric air, cooling water, or the like and intake air.

The internal combustion engine 1 is connected to an exhaust pipe 5. The exhaust pipe 5 is a pipe for circulating burnt gas (exhaust gas) discharged from each cylinder 2. The turbine 61 of the turbocharger 6 is arranged midway along the exhaust pipe 5. The turbine 61 converts thermal energy of exhaust gas into rotational energy. An exhaust gas purification apparatus is arranged in the exhaust pipe 5 on a downstream side of the turbine 61.

The exhaust gas purification apparatus includes a first catalyst casing 50, a second catalyst casing 51, and a third catalyst casing 52. The first catalyst casing 50 houses a three-way catalyst constituted by a honeycomb structure covered by a coat layer of alumina or the like and a noble metal (for example, platinum, palladium, or rhodium) carried on the coat layer.

The second catalyst casing 51 is arranged on a downstream side of the first catalyst casing 50. The second catalyst casing 51 houses a NOx storage reduction catalyst (NSR catalyst) constituted by a honeycomb structure covered by a coat layer of alumina or the like, a noble metal (for example, platinum, palladium, or rhodium) carried on the coat layer, and a NOx storage agent (alkalies, alkali earths, or the like) carried on the coat layer.

The third catalyst casing 52 is arranged on a downstream side of the second catalyst casing 51. The third catalyst casing 52 houses an SCR catalyst constituted by a honeycomb structure made of cordierite or heat resistant steel such as Fe—Cr—Al, an alumina-based or zeolite-based coat layer that covers the honeycomb structure, and a noble metal (for example, platinum or palladium) carried on the coat layer.

The internal combustion engine 1 includes an EGR apparatus 7. The EGR apparatus 7 includes an EGR passage 70, an EGR valve 71, and an EGR cooler 72. The EGR passage 70 connects a part of the exhaust pipe 5 on an upstream side of the turbine 61 and a part of the intake pipe 4 on a downstream side of the intercooler 41 to each other. The EGR passage 70 is a passage that guides a part of exhaust gas (EGR gas) flowing through the exhaust pipe 5 to the intake pipe 4. The EGR valve 71 and the EGR cooler 72 are arranged midway along the EGR passage 70. The EGR valve 71 is a valve apparatus that adjusts an amount of EGR gas by changing a passage sectional area of the EGR passage 70. The EGR cooler 72 is a device that performs heat exchange between EGR gas flowing through the EGR passage 70 and cooling water or atmospheric air.

An electronic control unit (ECU) 8 is annexed to the internal combustion engine 1 configured as described above. The ECU 8 is electrically connected to various sensors including an air-fuel ratio sensor (air-fuel ratio sensor) 9, an oxygen concentration sensor ($O_2$ sensor) 10, a first temperature sensor 11, a second temperature sensor 12, a third temperature sensor 13, a crank position sensor 14, an accelerator position sensor 15, and an air flow meter 42.

The air-fuel ratio sensor 9 is attached to the exhaust pipe 5 on an upstream side of the first catalyst casing 50 and outputs an electrical signal correlated to an air-fuel ratio of exhaust gas flowing into the first catalyst casing 50. The oxygen concentration sensor 10 is attached to the exhaust pipe 5 between the first catalyst casing 50 and the second catalyst casing 51 and outputs an electrical signal correlated to oxygen concentration of exhaust gas flowing out from the first catalyst casing 50. The first temperature sensor 11 is attached to the exhaust pipe 5 between the first catalyst casing 50 and the second catalyst casing 51 and outputs an electrical signal correlated to a temperature of exhaust gas flowing out from the first catalyst casing 50. The second temperature sensor 12 is attached to the exhaust pipe 5 between the second catalyst casing 51 and the third catalyst casing 52 and outputs an electrical signal correlated to a temperature of exhaust gas flowing out from the second catalyst casing 51. The third temperature sensor 13 is attached to the exhaust pipe 5 on a downstream side of the third catalyst casing 52 and outputs an electrical signal correlated to a temperature of exhaust gas that flows out from the third catalyst casing 52. The crank position sensor 14 is attached to the internal combustion engine 1 and outputs an electrical signal correlated to a rotational position of a crankshaft. The accelerator position sensor 15 is attached to an accelerator pedal 16 and outputs an electrical signal correlated to an operation amount (an accelerator depression amount) of the accelerator pedal 16. The air flow meter 42 is attached to the intake pipe 4 on an upstream side of the intake throttle valve 40 and outputs an electrical signal correlated to a mass of air (an intake air amount) that flows through the intake pipe 4.

In addition, the ECU 8 is electrically connected to various devices such as the fuel injection valve 3, the intake throttle valve 40, and the EGR valve 71. The ECU 8 controls the various devices described above based on output signals of the various sensors described above.

For example, the ECU 8 computes a rotational speed of the crankshaft (an engine rotational speed) based on an output signal from the crank position sensor 14. The ECU 8 computes a target intake air amount of the internal combustion engine 1 based on the engine rotational speed, an output signal (accelerator depression amount) of the accelerator position sensor 15, and the like. The ECU 8 controls an opening amount of the intake throttle valve 40 so that an output signal (intake air amount) of the air flow meter 42 matches the target intake air amount.

Based on the output signal (intake air amount) of the air flow meter 42, the accelerator depression amount, the engine rotational speed, and the like, the ECU 8 controls a valve opening timing (fuel injection timing) and a valve opening period (fuel injection amount) of the fuel injection valve 3. In doing so, the ECU 8 may perform feedback control of the fuel injection amount so that the output signal of the air-fuel ratio sensor 9 matches a target air-fuel ratio.

Moreover, as shown in FIG. 2, when an operating state of the internal combustion engine 1 is in a low rotation, low load range or a middle rotation, middle load range (a range A in FIG. 2), the ECU 8 sets the target air-fuel ratio to a lean air-fuel ratio that is higher than a stoichiometric air-fuel ratio. Hereinafter, the range A will be referred to as a lean operating range. When the operating state of the internal combustion engine 1 is in a high load range or a high rotation range (a range B in FIG. 2), the ECU 8 sets the target air-fuel ratio to the stoichiometric air-fuel ratio. By adjusting the air-fuel ratio of an air-fuel mixture for each range as shown in FIG. 2, a fuel consumption of the internal combustion engine 1 can be kept low.

When the target air-fuel ratio is set to a lean air-fuel ratio, NOx purification performance of the three-way catalyst housed in the first catalyst casing 50 declines. Therefore, when the target air-fuel ratio is set to a lean air-fuel ratio, NOx in exhaust gas must be purified by the NSR catalyst in the second catalyst casing 51 and the SCR catalyst in the third catalyst casing 52.

When oxygen concentration of exhaust gas flowing into the second catalyst casing 51 is high, the NSR catalyst stores or adsorbs NOx in the exhaust gas. When the oxygen concentration of exhaust gas flowing into the second catalyst casing 51 is low and, at the same time, a reduction component such as hydrocarbons (HC) and carbon monoxide (CO) is contained in the exhaust gas, the NSR catalyst releases NOx stored in the NSR catalyst and reduces the released NOx to nitrogen ($N_2$).

To this end, the ECU 8 periodically executes a rich spike process in the lean operating range. A rich spike process is a process of adjusting a fuel injection amount or an intake air amount so as to lower the oxygen concentration and raise the concentration of HC or CO in the exhaust gas. The rich spike process may be executed when an amount of stored NOx in the NSR catalyst equals or exceeds a certain amount, when an operating time from the end of a previous rich spike process (favorably, an operating time during which the target air-fuel ratio is set to the lean air-fuel ratio) equals or exceeds a certain time, or when a travel distance from the end of a previous rich spike process (favorably, a travel distance during which the target air-fuel ratio is set to the lean air-fuel ratio) equals or exceeds a certain distance.

As a specific method of executing a rich spike process, a method of executing at least one of a process of increasing a fuel injection amount of the fuel injection valve 3 and a process of reducing an opening amount of the intake throttle valve 40 can be used. Moreover, in a configuration in which the fuel injection valve 3 directly injects fuel into the cylinder 2, a rich spike process may be executed by a method of injecting fuel from the fuel injection valve 3 during an exhaust stroke of the cylinder 2.

The SCR catalyst adsorbs ammonia ($NH_3$) contained in exhaust gas. By causing a reaction between $NH_3$ adsorbed by the SCR catalyst and NOx in exhaust gas, the SCR catalyst reduces NOx to nitrogen ($N_2$). Moreover, $NH_3$ supplied to the SCR catalyst is generated by the three-way catalyst or the NSR catalyst. For example, when a rich spike process is executed, a part of NOx is reduced to $NH_3$ at the three-way catalyst and a part of NOx released from the NSR catalyst is reduced to $NH_3$ at the NSR catalyst. In this case, an amount of $NH_3$ generated at the NSR catalyst changes depending on intervals at which the rich spike process is executed, an air-fuel ratio at the time of execution of the rich spike process, or the like. Therefore, when $NH_3$ is supplied to the SCR catalyst, intervals at which the rich spike process is executed may be set to intervals suitable for generation of $NH_3$ or an air-fuel ratio at the time of execution of the rich spike process may be set to an air-fuel ratio suitable for generation of $NH_3$ (for example, around 14.1).

When NOx is reduced at the SCR catalyst, the three reduction reactions below may occur.

$$4NO+4NH_3+O_2 \rightarrow 4N_2+6H_2O \quad (1)$$

$$NO+NO_2+2NH_3 \rightarrow 2N_2+3H_2O \quad (2)$$

$$6NO_2+8NH_3 \rightarrow 7N_2+12H_2O \quad (3)$$

A reaction rate of (2) above is higher than reaction rates of (1) and (3) above. In addition, the reduction reaction (2) above occurs in a lower temperature range than the reduction reactions (1) and (3) above. Therefore, by accelerating the reaction (2) above, the NOx purification performance of the SCR catalyst can be improved. In this case, the reduction reaction (2) above is likely to occur when an amount (mol) of nitrogen monoxide (NO) and an amount (mol) of nitrogen dioxide ($NO_2$) contained in exhaust gas are approximately equal to one another. Since NO and $NO_2$ represent a large portion of the NOx in exhaust gas, the reduction reaction (2) above becomes active when the $NO_2$ proportion is approximately ½.

In consideration thereof, when the NOx purification performance of the three-way catalyst or the NSR catalyst is low or when a temperature of the SCR catalyst is low, the exhaust gas purification system of an internal combustion engine according to the present embodiment performs a process of causing a $NO_2$ proportion of exhaust gas flowing into the SCR catalyst to approach ½ (hereinafter, referred to as a "$NO_2$ proportion adjustment process"). Hereinafter, a method of executing the $NO_2$ proportion adjustment process will be described.

The $NO_2$ proportion of exhaust gas changes in accordance with an air-fuel ratio of an air-fuel mixture or an amount of EGR gas. FIG. 3 is a diagram showing a correlation between an air-fuel ratio of an air-fuel mixture and a $NO_2$ proportion. In FIG. 3, when the air-fuel ratio of the air-fuel mixture is high (when lean), the $NO_2$ proportion increases as compared to when the air-fuel ratio of the air-fuel mixture is low (when rich). FIG. 4 is a diagram showing a correlation between an EGR rate (a proportion of an amount of EGR gas to an amount of gas sucked into the cylinder 2) and a $NO_2$ proportion. In FIG. 4, when the EGR rate is high, the $NO_2$ proportion increases as compared to when the EGR rate is low. Moreover, since the EGR rate increases as the amount of EGR gas increases, it can also be stated that when the amount of EGR gas is large, the $NO_2$ proportion increases as compared to when the amount of EGR gas is small.

If the air-fuel ratio of the air-fuel mixture or the EGR rate (the amount of EGR gas) is inadvertently changed when the $NO_2$ proportion must be changed, an operating state of the internal combustion engine 1, purification performance of the exhaust gas purification apparatus, and the like may be subjected to adverse effects. For example, if the EGR rate is increased when a temperature of at least one of the three-way catalyst, the NSR catalyst, and the SCR catalyst is high, a temperature of exhaust gas rises. As a result, the temperature of the three-way catalyst, the NSR catalyst, or the SCR catalyst may exceed a temperature purification window. When the temperature of at least one of the three-way catalyst, the NSR catalyst, and the SCR catalyst exceeds the temperature purification window, purification performances of the catalysts actually decline and may result in deterioration of emissions.

In addition, if the EGR rate is lowered or the air-fuel ratio of the air-fuel mixture is increased (changed to a leaner air-fuel ratio) when the temperature of at least one of the three-way catalyst, the NSR catalyst, and the SCR catalyst is low, the temperature of exhaust gas drops. As a result, the temperature of the three-way catalyst, the NSR catalyst, or the SCR catalyst may drop below the temperature purification window. When the temperature of at least one of the three-way catalyst, the NSR catalyst, and the SCR catalyst drops below the temperature purification window, purification performances of the catalysts actually decline and may result in deterioration of emissions.

Furthermore, if the air-fuel ratio of the air-fuel mixture is increased or reduced when the internal combustion engine 1 is in a steady operating state, a torque fluctuation of the internal combustion engine may occur. In this case, a driver of a vehicle may sense a feeling of discomfort.

In consideration thereof, in the $NO_2$ proportion adjustment process according to the present embodiment, if a need arises to change a $NO_2$ proportion when an operating state of the internal combustion engine 1 belongs to the lean operating range (the range A in FIG. 2) described earlier with reference to FIG. 2, the ECU 8 executes the $NO_2$ proportion adjustment process by a method in accordance with an operating state of the internal combustion engine, a state of the exhaust gas purification apparatus, or the like.

First, if the temperature of at least one of the three-way catalyst, the NSR catalyst, and the SCR catalyst is high when the $NO_2$ proportion must be increased, the ECU 8 makes an increase in EGR gas small and makes an increase in the air-fuel ratio large as compared to when the temperatures of the catalysts are low. For example, as shown in FIG. 5, in a range (a range A1 in FIG. 5) where engine load is small and engine rotational speed is high among the lean operating range, the increase in EGR gas is kept small and the increase in the air-fuel ratio is made large as compared to other lean operating ranges. Favorably, when the temperature of the three-way catalyst, the NSR catalyst, or the SCR catalyst is higher than a prescribed temperature (for example, a temperature that is an upper limit value of a temperature purification window or a temperature obtained by subtracting a prescribed margin from the upper limit value of the temperature purification window), the ECU 8 may increase the $NO_2$ proportion by increasing the air-fuel ratio of the air-fuel mixture without increasing EGR gas. In addition, in the range A1, the ECU 8 may make an increase in EGR smaller and make an increase in the air-fuel ratio larger as the temperature of the three-way catalyst, the NSR catalyst, or the SCR catalyst rises. Furthermore, when the temperature of the three-way catalyst, the NSR catalyst, or the SCR catalyst approximates the upper limit value of the temperature purification window or exceeds the upper limit value, the air-fuel ratio may be increased while reducing the amount of EGR gas. In this case, since a temperature of exhaust gas drops further, the $NO_2$ proportion can be increased while keeping the temperature of the three-way catalyst, the NSR catalyst, or the SCR catalyst within the temperature purification window.

When the $NO_2$ proportion adjustment process is executed by the method described above, the $NO_2$ proportion can be increased while keeping the temperature of exhaust gas discharged from the internal combustion engine 1 low. As a result, the NOx purification performance of the SCR catalyst can be improved while preventing the temperature of the three-way catalyst, the NSR catalyst, or the SCR catalyst from rising excessively. When the temperature of the three-way catalyst, the NSR catalyst, or the SCR catalyst is prevented from rising excessively, declines in purification rates with respect to substances other than NOx (for example, purification rates of hydrocarbons (HC) and carbon monoxide (CO)) of the three-way catalyst, the NSR catalyst, and the SCR catalyst can be prevented.

Meanwhile, knocking is likely to occur in a range where engine load is high (a range A3 in FIG. 5) among the lean operating range. Therefore, if an attempt is made to increase the $NO_2$ proportion by a method of increasing the air-fuel ratio while reducing the amount of EGR gas when the operating state of the internal combustion engine 1 belongs to the range A3, knocking may possibly occur even more readily. In addition, if an attempt is made to reduce the $NO_2$ proportion by a method of reducing the amount of EGR gas when reducing the $NO_2$ proportion in the range A3, knocking may occur even more readily. Therefore, even when reducing the $NO_2$ proportion, if the operating state of the internal combustion engine 1 belongs to the range A3, the $NO_2$ proportion is desirably reduced by a method of reducing the air-fuel ratio of the air-fuel mixture (changing to a rich air-fuel ratio) without reducing the amount of EGR gas. Hereinafter, an operating range where knocking is likely to occur as in the case of the range A3 will be referred to as a "knock range".

Next, if the temperature of at least one of the three-way catalyst, the NSR catalyst, and the SCR catalyst is low when the $NO_2$ proportion must be increased, the ECU 8 makes an increase in EGR gas large and keeps an increase in the air-fuel ratio small as compared to when the temperatures of the catalysts are high. For example, as shown in FIG. 5, in a range (a range A2 in FIG. 5) where engine load is small and engine rotational speed is low among the lean operating range, the increase in EGR gas is made large and, at the same time, the increase in the air-fuel ratio is made small as compared to other lean operating ranges. Favorably, when the temperature of the three-way catalyst, the NSR catalyst, or the SCR catalyst is lower than a prescribed temperature (for example, a temperature that is a lower limit value of a temperature purification window or a temperature obtained by adding a prescribed margin to the lower limit value of the temperature purification window), the ECU 8 may increase the $NO_2$ proportion by increasing the amount of EGR gas without increasing the air-fuel ratio. In addition, in the range A2, the ECU 8 may make an increase in EGR larger and make an increase in the air-fuel ratio smaller as the temperature of the three-way catalyst, the NSR catalyst, or the SCR catalyst drops. Furthermore, when the temperature of the three-way catalyst, the NSR catalyst, or the SCR catalyst approximates the lower limit value of the temperature purification window or drops below the lower limit value, the amount of EGR gas may be increased while reducing the air-fuel ratio. In this case, since a temperature of exhaust gas rises further, the $NO_2$ proportion can be increased while keeping the temperature of the three-way catalyst, the NSR catalyst, or the SCR catalyst within the temperature purification window.

When the $NO_2$ proportion adjustment process is executed by the method described above, the $NO_2$ proportion can be increased while raising the temperature of exhaust gas at a point of discharge from the internal combustion engine 1. As a result, the NOx purification performance of the SCR catalyst can be improved while preventing the temperature of the three-way catalyst, the NSR catalyst, or the SCR catalyst from dropping excessively. When the temperature of the three-way catalyst, the NSR catalyst, or the SCR catalyst is prevented from dropping excessively, declines in purification rates with respect to substances other than NOx (for example, purification rates of hydrocarbons (HC) and carbon monoxide (CO)) of the three-way catalyst, the NSR catalyst, and the SCR catalyst can be prevented.

Moreover, when the internal combustion engine 1 is in a transient operating state, the $NO_2$ proportion adjustment process is desirably executed by a method of changing the air-fuel ratio of the air-fuel mixture without changing the amount of EGR gas. A certain period of time (response delay time) is required from the ECU 8 outputting a command value related to a change in an opening amount of the EGR valve 71 to the $NO_2$ proportion changing. Therefore, when the internal combustion engine 1 is performing a transient operation, even when a $NO_2$ proportion adjustment process accompanying a change in an amount of EGR gas is performed, an actual $NO_2$ proportion may not assume a proportion suitable for a transient operating state. As a result, emissions when the internal combustion engine 1 is performing a transient operation may deteriorate. In contrast, a period of time required from the ECU 8 outputting a command value related to a change in an air-fuel ratio (a change in a fuel injection amount) to the $NO_2$ proportion changing is sufficiently shorter than the response delay time described above. Therefore, when the internal combustion engine 1 is performing a transient operation, executing the $NO_2$ proportion adjustment process by a method of increasing the air-fuel ratio without changing the amount of EGR gas enables the $NO_2$ proportion to be adjusted while preventing emissions from deteriorating. With the method of changing the air-fuel ratio of the air-fuel mixture without changing the amount of EGR gas, there is a concern that torque fluctuation of the internal combustion engine 1 may increase as compared to a method of changing both the amount of EGR gas and the air-fuel ratio. However, when the internal combustion engine 1 is in a transient operating state, torque fluctuation that is permissible by a driver conceivably increases as compared to when internal combustion engine is in a steady operating state. Therefore, the $NO_2$ proportion can be adjusted while reducing a sense of discomfort that is felt by the driver.

As described above, by changing a method of executing the $NO_2$ proportion adjustment process in accordance with an operating state of the internal combustion engine 1, a state of the exhaust gas purification apparatus, and the like, the $NO_2$ proportion can be adjusted while preventing an increase in the fuel consumption, occurrences of knocking, a sense of discomfort felt by the driver, deterioration in emissions, and the like.

Moreover, a $NO_2$ proportion of exhaust gas flowing into the SCR catalyst changes in accordance with states of the three-way catalyst and the NSR catalyst. A relationship between positions of exhaust gas and $NO_2$ proportions at the respective positions is shown in FIG. 6. A vertical axis in FIG. 6 represents $NO_2$ proportions and a horizontal axis represents positions of exhaust gas. In addition, P1 in FIG. 6 denotes a position on an upstream side of the first catalyst casing 50, P2 denotes a position between the first catalyst casing 50 and the second catalyst casing 51, and P3 denotes a position between the second catalyst casing 51 and the third catalyst casing 52.

In FIG. 6, when purification performances of the three-way catalyst and the NSR catalyst are appropriate, a part of $NO_2$ discharged from the internal combustion engine 1 is reduced to NO by palladium in the three-way catalyst as indicated by a solid arrow in FIG. 6. As a result, a $NO_2$ proportion of exhaust gas flowing out from the first catalyst casing 50 (exhaust gas at the position P2 in FIG. 6) becomes smaller than a $NO_2$ proportion of exhaust gas flowing into the first catalyst casing 50 (exhaust gas at the position P1 in FIG. 6). In addition, at the second catalyst casing 51, a part of NO contained in the exhaust gas is oxidized to $NO_2$ by platinum in the SCR catalyst. As a result, a $NO_2$ proportion (R0 in FIG. 6) of exhaust gas flowing out from the second catalyst casing 51 (exhaust gas at the position P3 in FIG. 6) becomes larger than a $NO_2$ proportion of exhaust gas flowing into the second catalyst casing 51 (the exhaust gas flowing out from the first catalyst casing 50).

In contrast, when the purification performance of the three-way catalyst is low, an amount of $NO_2$ reduced by the three-way catalyst decreases. Therefore, as indicated by a one-dot chain arrow in FIG. 6, a $NO_2$ proportion at the position P2 becomes larger than when the purification performances of the three-way catalyst and the NSR catalyst are appropriate. As a result, a $NO_2$ proportion (R1 in FIG. 6) at the position P3 becomes larger than the $NO_2$ proportion R0 in the case where the purification performances of the three-way catalyst and the NSR catalyst are appropriate.

When the purification performance of the NSR catalyst is low, an amount of NO oxidized at the NSR catalyst decreases. Therefore, as indicated by a dashed arrow in FIG. 6, a $NO_2$ proportion (R2 in FIG. 6) at the position P3 becomes smaller than the $NO_2$ proportion R0 in the case where the purification performances of the three-way catalyst and the NSR catalyst are appropriate.

When the purification performances of the three-way catalyst and the NSR catalyst are low, the amount of $NO_2$ reduced by the three-way catalyst decreases and the amount of NO oxidized by the NSR catalyst decreases. Therefore, as indicated by a two-dot chain arrow in FIG. 6, a $NO_2$ proportion (R3 in FIG. 6) at the position P3 assumes a size approximating the $NO_2$ proportion at the position P1. However, the $NO_2$ proportion R3 at the position P3 changes in accordance with degrees of decline of the respective purification performances of the three-way catalyst and the NSR catalyst.

Therefore, when the purification performance of at least one of the three-way catalyst and the NSR catalyst has declined, a $NO_2$ proportion of exhaust gas discharged from the internal combustion engine 1 must be changed in accordance with a degree of decline of the purification performance.

First, when the purification performance of the three-way catalyst has declined, a $NO_2$ proportion of exhaust gas flowing into the SCR catalyst increases as compared to when the purification performances of the three-way catalyst and the NSR catalyst are appropriate. Therefore, a $NO_2$ proportion of exhaust gas discharged from the internal combustion engine 1 may be set smaller than a case where the purification performances of the three-way catalyst and the NSR catalyst are appropriate. Specifically, when the purification performance of the three-way catalyst has declined, at least one of an increase in EGR gas and an increase in the air-fuel ratio may be made smaller than a case where the purification performances of the three-way catalyst and the NSR catalyst are appropriate. However, when the operating state of the internal combustion engine 1 belongs to the range A3 (knock range) described earlier with reference to FIG. 5, the increase in the air-fuel ratio may be made smaller without changing an amount of EGR gas.

When the purification performance of the NSR catalyst has declined, a $NO_2$ proportion of exhaust gas flowing into the SCR catalyst decreases as compared to when the purification performances of the three-way catalyst and the NSR catalyst are appropriate. Therefore, a $NO_2$ proportion of exhaust gas discharged from the internal combustion engine 1 may be set larger than a case where the purification performances of the three-way catalyst and the NSR catalyst are appropriate. Specifically, when the purification performance of the NSR catalyst has declined, at least one of an increase in EGR gas and an increase in the air-fuel ratio may be made larger than a case where the purification performances of the three-way catalyst and the NSR catalyst are appropriate.

When the purification performances of the three-way catalyst and the NSR catalyst have declined, an increase in EGR gas or an increase in the air-fuel ratio may be corrected in accordance with degrees of decline of the respective performances of the three-way catalyst and the NSR catalyst. The purification performances of the three-way catalyst and the NSR catalyst decline when the respective catalysts have deteriorated, when temperatures of the respective catalysts have deviated from the temperature purification window, when flow rates of exhaust gas passing through the respective catalysts are high, and the like.

Moreover, since the three-way catalyst and the NSR catalyst have oxygen storage capabilities, a degree of deterioration of each catalyst can be specified by specifying a degree of deterioration of the oxygen storage capability. As a method of specifying a degree of deterioration of the oxygen storage capability, a known method such as that described in Japanese Patent Application Laid-open No. H8-260949 can be used. By obtaining a relationship between a degree of deterioration of the three-way catalyst and a $NO_2$ reduction rate of the three-way catalyst (a proportion of an amount of $NO_2$ reduced by the three-way catalyst to an amount of $NO_2$ flowing into the three-way catalyst) in advance, an amount of $NO_2$ reduced by the three-way catalyst when the three-way catalyst has deteriorated can be specified. In a similar manner, by obtaining a relationship between a degree of deterioration of the NSR catalyst and a NO oxidation rate of the NSR catalyst (a proportion of an amount of NO oxidized by the NSR catalyst to an amount of NO flowing into the NSR catalyst) in advance, an amount of NO oxidized by the NSR catalyst when the NSR catalyst has deteriorated can be specified.

The temperature of the three-way catalyst and the temperature of the NSR catalyst can be respectively specified based on measurement values of the first temperature sensor 11 and the second temperature sensor 12. By obtaining a relationship between a temperature of the three-way catalyst and a $NO_2$ reduction rate of the three-way catalyst in advance, an amount of $NO_2$ reduced by the three-way catalyst when the temperature of the three-way catalyst has deviated from the temperature purification window can be specified. In a similar manner, by obtaining a relationship between a temperature of the NSR catalyst and a NO oxidation rate of the NSR catalyst in advance, an amount of NO oxidized by the NSR catalyst when the temperature of the NSR catalyst has deviated from the temperature purification window can be specified.

Flow rates of exhaust gas passing through the three-way catalyst and the NSR catalyst can be specified based on a measurement value of the air flow meter 42 and an engine rotational speed. By obtaining a relationship between a flow rate of exhaust gas passing through the three-way catalyst and a $NO_2$ reduction rate of the three-way catalyst in advance, an amount of $NO_2$ reduced by the three-way catalyst when the flow rate of exhaust gas passing through the three-way catalyst is high can be specified. In a similar manner, by obtaining a relationship between a flow rate of exhaust gas passing through the NSR catalyst and a NO oxidation rate of the NSR catalyst in advance, an amount of NO oxidized by the NSR catalyst when the flow rate of exhaust gas passing through the NSR catalyst is high can be specified.

On the other hand, a $NO_2$ proportion of exhaust gas discharged from the internal combustion engine 1 can be computed using an air-fuel ratio of an air-fuel mixture, an amount of EGR gas, a fuel injection timing, and the like as parameters. Therefore, a $NO_2$ proportion of exhaust gas flowing into the SCR catalyst may be computed using the $NO_2$ proportion of exhaust gas discharged from the internal combustion engine 1, the $NO_2$ reduction rate of the three-way catalyst, and the NO oxidation rate of the NSR catalyst as parameters. In this case, a map or a functional expression defining a relationship among the $NO_2$ proportion of exhaust gas discharged from the internal combustion engine 1, the $NO_2$ reduction rate of the three-way catalyst, the NO oxidation rate of the NSR catalyst, and the $NO_2$ proportion of exhaust gas flowing into the SCR catalyst may be stored in a ROM of the ECU 8.

As described above, when the $NO_2$ proportion of exhaust gas discharged from the internal combustion engine 1 is changed in accordance with the purification performances of the three-way catalyst and the NSR catalyst, even in a case where the purification performance of at least one of the three-way catalyst and the NSR catalyst has declined, the $NO_2$ proportion of exhaust gas flowing into the SCR catalyst can be set to a desired proportion.

In addition, in a configuration where a NOx sensor is attached to the exhaust pipe 5 between the second catalyst casing 51 and the third catalyst casing 52, the $NO_2$ proportion of exhaust gas discharged from the internal combustion engine 1 may be subjected to feedback control based on a measurement value of the NOx sensor. An amount of $NO_2$ contained in exhaust gas is approximately constant regardless of the $NO_2$ proportion. Therefore, a difference between a measurement value of the NOx sensor before executing a $NO_2$ proportion adjustment process and a measurement value of the NOx sensor after executing the $NO_2$ proportion adjustment process corresponds to an amount of change in NO. When an amount of change in NO is specified by such a method, a $NO_2$ proportion after executing the $NO_2$ proportion adjustment process can also be specified. Therefore, feedback control based on a difference between the $NO_2$ proportion after executing the $NO_2$ proportion adjustment process and a target $NO_2$ proportion can be performed. When feedback control is executed by such a method, a $NO_2$ proportion flowing into the SCR catalyst can be brought closer to the target $NO_2$ proportion in a more reliable manner.

Moreover, since there is correlation among a temperature of the SCR catalyst, a NOx purification rate of the SCR catalyst, and a $NO_2$ proportion of exhaust gas flowing into the SCR catalyst, the $NO_2$ proportion of exhaust gas flowing into the SCR catalyst may be obtained using a map or a functional expression with the temperature of the SCR catalyst and the NOx purification rate of the SCR catalyst as arguments. In doing so, a measurement value of the third temperature sensor 13 can be used as the temperature of the SCR catalyst. The NOx purification rate of the SCR catalyst can be computed using an amount of NOx contained in exhaust gas flowing into the third catalyst casing 52 (NOx inflow rate) and an amount of NOx contained in exhaust gas flowing out from the third catalyst casing 52 (NOx outflow rate) as parameters. The NOx inflow rate and the NOx outflow rate can be obtained by attaching NOx sensors to the exhaust pipe 5 preceding and following the third catalyst casing 52.

Hereinafter, an execution procedure of the $NO_2$ proportion adjustment process according to the present embodiment will now be described with reference to FIG. 7. FIG. 7 is a flow chart showing a processing routine executed by the ECU 8 when the $NO_2$ proportion adjustment process is executed. This processing routine is stored in the ROM of the ECU 8 in advance and is periodically executed by the ECU 8 (CPU).

In the processing routine shown in FIG. 7, first, in the process of S101, the ECU 8 determines whether or not the operating state of the internal combustion engine 1 belongs to the lean operating range described earlier. When a negative determination is made in the process of S101, the ECU 8 temporarily ends the execution of the present routine.

When a positive determination is made in the process of S101, the ECU 8 proceeds to a process of S102.

In the process of S102, the ECU 8 determines whether or not a $NO_2$ proportion in exhaust gas flowing into the SCR catalyst is smaller than a target $NO_2$ proportion Rno2trg. The "target $NO_2$ proportion Rno2trg" in this case is a $NO_2$ proportion at which a proportion of $NO_2$ in NOx contained in the exhaust gas is ½ or, favorably, a $NO_2$ proportion at which a proportion of an amount of $NO_2$ to a total amount of NO and $NO_2$ contained in the exhaust gas is ½ (a $NO_2$ proportion at which an amount of NO and an amount of $NO_2$ are equal to one another). However, a $NO_2$ proportion at which the reduction reaction (2) described earlier becomes most active may change depending on an amount of HC flowing into the SCR catalyst or an amount of HC adhering to the SCR catalyst. For example, when the amount of HC flowing into the SCR catalyst or the amount of HC adhering to the SCR catalyst increases, the $NO_2$ proportion at which the reduction reaction (2) described earlier becomes most active exceeds ½. Therefore, the target $NO_2$ proportion described above may be changed in accordance with the amount of HC flowing into the SCR catalyst or the amount of HC adhering to the SCR catalyst.

In the process of S102, the ECU 8 may determine that a $NO_2$ proportion Rno2 is smaller than the target $NO_2$ proportion Rno2trg when the purification performance of the three-way catalyst is appropriate and, at the same time, the purification performance of the NSR catalyst has declined. Alternatively, as described earlier, the ECU 8 may compute the $NO_2$ proportion Rno2 in exhaust gas flowing into the SCR catalyst using the $NO_2$ proportion of exhaust gas discharged from the internal combustion engine 1, the $NO_2$ reduction rate of the three-way catalyst, and the NO oxidation rate of the NSR catalyst as parameters, and compare the $NO_2$ proportion Rno2 and the target $NO_2$ proportion Rno2trg with each other. Furthermore, the ECU 8 may compute the $NO_2$ proportion Rno2 in exhaust gas flowing into the SCR catalyst using a temperature of the SCR catalyst (a measurement value of the third temperature sensor 13) and the NOx purification rate of the SCR catalyst as parameters and compare the $NO_2$ proportion Rno2 and the target $NO_2$ proportion Rno2trg with each other.

When a positive determination is made in the process of S102 (Rno2<Rno2trg), the ECU 8 proceeds to a process of S103. In the process of S103, the ECU 8 determines whether or not a failure has occurred at the EGR valve 71. A determination of whether or not a failure has occurred at the EGR valve 71 is made based on a diagnostic result of a separate failure diagnosing process.

When a positive determination is made in the process of S103, the ECU 8 proceeds to a process of S104 to increase the $NO_2$ proportion Rno2 by increasing an air-fuel ratio (A/F) of an air-fuel mixture. In this case, the $NO_2$ proportion Rno2 can be increased even if a failure has occurred at the EGR valve 71.

When a negative determination is made in the process of S103, the ECU 8 proceeds to a process of S105 to determine whether or not the internal combustion engine 1 is in a transient operating state. When a positive determination is made in the process of S105, the ECU 8 proceeds to the process of S104 to increase the $NO_2$ proportion Rno2 by increasing the air-fuel ratio (A/F) of the air-fuel mixture. In this case, the $NO_2$ proportion Rno2 in exhaust gas flowing into the SCR catalyst can be promptly increased. As a result, the NOx purification performance of the SCR catalyst can be improved even when the internal combustion engine 1 is in a transient operating state.

When a negative determination is made in the process of S105, the ECU 8 proceeds to a process of S106 to determine whether or not at least one of the three-way catalyst, the NSR catalyst, and the SCR catalyst is in a high temperature state. For example, the ECU 8 determines that at least one of the three-way catalyst, the NSR catalyst, and the SCR catalyst is in a high temperature state if a temperature of at least one of the three-way catalyst, the NSR catalyst, and the SCR catalyst is higher than an upper limit value of a temperature purification window or a value obtained by subtracting a prescribed margin from the upper limit value. Moreover, the ECU 8 may determine that at least one of the three-way catalyst, the NSR catalyst, and the SCR catalyst is in a high temperature state if the operating state of the internal combustion engine 1 belongs to the range A1 described earlier with reference to FIG. 5.

When a positive determination is made in the process of S106, the ECU 8 proceeds to the process of S104 to increase the $NO_2$ proportion Rno2 by increasing the air-fuel ratio (A/F) of the air-fuel mixture. In this case, the NOx purification performance of the SCR catalyst can be improved while preventing the temperature of the three-way catalyst, the NSR catalyst, or the SCR catalyst from rising excessively.

When a negative determination is made in the process of S106, the ECU 8 proceeds to a process of S107 to increase the $NO_2$ proportion Rno2 by increasing an amount of EGR gas. In this case, the NOx purification performance of the SCR catalyst can be improved while preventing an increase in an amount of generated NOx, occurrences of knocking, and the like.

Moreover, both of the process of S105 and the process of S106 need not necessarily be executed and only one of the processes may be executed instead. In other words, the process of S104 may be executed when a positive determination is made in either one of the processes of S105 and S106, and the process of S107 may be executed when a negative determination is made in either one of the processes of S105 and S106.

In addition, when a negative determination is made in the process of S102 (Rno2≥Rno2trg), the ECU 8 proceeds to a process of S108 to determine whether or not the $NO_2$ proportion Rno2 in exhaust gas flowing into the SCR catalyst is larger than the target $NO_2$ proportion Rno2trg. When a negative determination is made in the process of S108 (Rno2=Rno2trg), the ECU 8 temporarily ends the execution of the present routine. When a positive determination is made in the process of S108 (Rno2>Rno2trg), the ECU 8 proceeds to a process of S109.

In the process of S109, the ECU 8 determines whether or not the operating state of the internal combustion engine 1 belongs to the range A3 (knock range) described earlier with reference to FIG. 5. When a positive determination is made in the process of S109, the ECU 8 proceeds to a process of S110.

In the process of S110, the ECU 8 reduces the $NO_2$ proportion Rno2 by reducing the air-fuel ratio (A/F) of the air-fuel mixture. In this case, since the amount of EGR gas is not reduced, the NOx purification performance of the SCR catalyst can be improved while preventing occurrences of knocking.

When a negative determination is made in the process of S109, the ECU 8 proceeds to a process of S111 to determine whether or not at least one of the three-way catalyst, the NSR catalyst, and the SCR catalyst is in a low temperature state. For example, the ECU 8 determines that at least one of the three-way catalyst, the NSR catalyst, and the SCR catalyst is in a high temperature state if a temperature of at least one of the three-way catalyst, the NSR catalyst, and the SCR catalyst is lower than a lower limit value of the temperature purification window or a value obtained by adding a prescribed margin to the lower limit value. Moreover, the ECU 8 may determine that at least one of the three-way catalyst, the NSR catalyst, and the SCR catalyst is in a low temperature state if the operating state of the internal combustion engine 1 belongs to the range A2 described earlier with reference to FIG. 5.

When a positive determination is made in the process of S111, the ECU 8 proceeds to the process of S110 to reduce the $NO_2$ proportion Rno2 by reducing the air-fuel ratio (A/F) of the air-fuel mixture. In this case, since the amount of EGR gas is not reduced, the $NO_2$ proportion Rno2 can be reduced while preventing exhaust gas temperature from dropping. As a result, the NOx purification performance of the SCR catalyst can be improved while preventing the temperature of the three-way catalyst, the NSR catalyst, or the SCR catalyst from dropping excessively.

When a negative determination is made in the process of S111, the ECU 8 proceeds to a process of S112 to reduce the $NO_2$ proportion Rno2 by reducing an amount of EGR gas. In this case, since the air-fuel ratio (A/F) of the air-fuel mixture does not decrease, the $NO_2$ proportion Rno2 can be reduced without increasing fuel consumption by the internal combustion engine 1.

The control means according to the present invention is realized as the ECU 8 executes the processing routine shown in FIG. 7 as described above. As a result, the NOx purification performance of the exhaust gas purification apparatus can be improved while preventing adverse effects on the operating state of the internal combustion engine 1 and the purification performance of the exhaust gas purification apparatus.

First Modification

In the embodiment described above, if the internal combustion engine 1 is in a transient operating state (if a positive determination is made in the process of S105 in FIG. 7) when a $NO_2$ proportion is smaller than a target $NO_2$ proportion and a failure of the EGR valve 71 has not occurred, an air-fuel ratio is increased without increasing an amount of EGR gas. However, the air-fuel ratio may be increased while increasing the amount of EGR gas. For example, when the internal combustion engine 1 is in a relatively gradual accelerating operating state, an increase in the amount of EGR gas may possibly be reflected in the $NO_2$ proportion during a transient operating period of the internal combustion engine 1. Therefore, by increasing the air-fuel ratio while increasing the amount of EGR gas, the $NO_2$ proportion can be improved while expecting an effect of preventing an increase in an amount of generated NOx and occurrences of knocking.

Second Modification

In the embodiment described above, if the exhaust gas purification apparatus is in a high temperature state (if a positive determination is made in the process of S106 in FIG. 7) when a $NO_2$ proportion is smaller than a target $NO_2$ proportion and a failure of the EGR valve 71 has not occurred, an air-fuel ratio is increased without changing an amount of EGR gas. However, the air-fuel ratio may be increased while changing the amount of EGR gas.

Specifically, when a temperature of at least one of the three-way catalyst, the NSR catalyst, and the SCR catalyst exceeds an upper limit value of a temperature purification window, the air-fuel ratio may be increased while reducing EGR gas. In this case, the $NO_2$ proportion can be increased while lowering the temperature of the three-way catalyst, the NSR catalyst, or the SCR catalyst.

When a temperature of at least one of the three-way catalyst, the NSR catalyst, and the SCR catalyst is equal to or lower than the upper limit value of the temperature purification window and a difference thereof from the upper limit value is relatively small, the air-fuel ratio of the air-fuel mixture may be increased without increasing EGR gas. In this case, the $NO_2$ proportion can be increased while preventing the temperature of the three-way catalyst, the NSR catalyst, or the SCR catalyst from rising.

When a temperature of at least one of the three-way catalyst, the NSR catalyst, and the SCR catalyst is equal to or lower than the upper limit value of the temperature purification window and a difference thereof from the upper limit value is relatively large, the air-fuel ratio of the air-fuel mixture may be increased while slightly increasing EGR gas. In this case, the $NO_2$ proportion can be increased while preventing the temperature of the three-way catalyst, the NSR catalyst, or the SCR catalyst from rising excessively. Furthermore, an effect of reducing an amount of generated NOx, an effect of preventing knocking, and the like due to the increase in EGR gas can be produced.

Third Modification

In the embodiment described above, if the internal combustion engine 1 is not in a transient operating state and the exhaust gas purification apparatus is not in a high temperature state (if a negative determination is made in the process of S106 in FIG. 7) when a $NO_2$ proportion is smaller than a target $NO_2$ proportion and a failure of the EGR valve 71 has not occurred, an amount of EGR gas is increased without increasing an air-fuel ratio. However, the amount of EGR gas may be increased while increasing the air-fuel ratio.

Specifically, the amount of EGR gas may be increased while increasing the air-fuel ratio when a torque fluctuation of the internal combustion engine 1 is within an allowable range. In this case, the $NO_2$ proportion can be increased while obtaining an effect of reducing fuel consumption due to an increase in the air-fuel ratio.

Fourth Modification

In the embodiment described above, if the operating state of the internal combustion engine 1 is in a knock range (if a positive determination is made in the process of S109 in FIG. 7) when a $NO_2$ proportion is larger than a target $NO_2$ proportion, an air-fuel ratio is reduced without changing an amount of EGR gas. However, the air-fuel ratio may be reduced while changing the amount of EGR gas.

Specifically, if an engine load is relatively low or a temperature of atmosphere in the cylinder 2 is relatively low in a case where the operating state of the internal combustion engine 1 belongs to a knock range, the air-fuel ratio may be reduced while slightly reducing the amount of EGR gas. In this case, the $NO_2$ proportion can be reduced while keeping an increase in fuel consumption due to a decline in the air-fuel ratio small.

In addition, if the engine load is relatively high or the temperature of the atmosphere in the cylinder 2 is relatively high in a case where the operating state of the internal combustion engine 1 belongs to a knock range, the air-fuel ratio may be reduced while increasing the amount of EGR gas. In this case, the NO$_2$ proportion can be reduced while preventing occurrences of knocking in a more reliable manner.

Fifth Modification

In the embodiment described above, if the exhaust gas purification apparatus is in a low temperature state (if a negative determination is made in the process of S111 in FIG. 7) when a NO$_2$ proportion is larger than a target NO$_2$ proportion and, at the same time, the operating state of the internal combustion engine 1 does not belong to a knock range, an amount of EGR gas is reduced without changing an air-fuel ratio. However, the amount of EGR gas may be reduced while changing the air-fuel ratio.

Specifically, when a temperature of at least one of the three-way catalyst, the NSR catalyst, and the SCR catalyst is below a lower limit value of a temperature purification window, the amount of EGR gas may be increased while reducing the air-fuel ratio. In this case, the NO$_2$ proportion can be reduced while raising the temperature of the three-way catalyst, the NSR catalyst, or the SCR catalyst.

When the temperature of at least one of the three-way catalyst, the NSR catalyst, and the SCR catalyst is equal to or higher than the lower limit value of the temperature purification window, the amount of EGR gas may be increased while slightly reducing the air-fuel ratio. In this case, the NO$_2$ proportion can be reduced while preventing the temperature of the three-way catalyst, the NSR catalyst, or the SCR catalyst from dropping.

When the temperature of at least one of the three-way catalyst, the NSR catalyst, and the SCR catalyst is equal to or higher than the lower limit value of the temperature purification window and a difference thereof from the lower limit value is relatively large, the amount of EGR gas may be increased without reducing the air-fuel ratio. In this case, the NO$_2$ proportion can be reduced while preventing an increase in fuel consumption due to a drop in the temperature of the three-way catalyst, the NSR catalyst, or the SCR catalyst and a decline in the air-fuel ratio.

The first to fifth modifications described above can be combined as appropriate. In this case, the NO$_2$ proportion can be adjusted while appropriately preventing an increase in fuel consumption, occurrences of knocking, a sense of discomfort felt by a driver, deterioration of emissions, and the like.

Moreover, while an example in which the first catalyst casing 50 and the second catalyst casing 4 are arranged on an upstream side of the third catalyst casing 52 has been described in the present embodiment described earlier, only one of the first catalyst casing 50 and the second catalyst casing 4 may be arranged or both the first catalyst casing 50 and the second catalyst casing 4 may not be arranged.

EXPLANATION OF REFERENCE NUMERALS AND CHARACTERS

1 Internal combustion engine
2 Cylinder
3 Fuel injection valve
4 Intake pipe
5 Exhaust pipe
6 Turbocharger
7 EGR apparatus
8 ECU
9 Air-fuel ratio sensor
10 Oxygen concentration sensor
11 First temperature sensor
12 Second temperature sensor
13 Third temperature sensor
16 Accelerator pedal
40 Intake throttle valve
50 First catalyst casing
51 Second catalyst casing
52 Third catalyst casing
60 Compressor
61 Turbine
70 EGR passage
71 EGR valve
72 EGR cooler

The invention claimed is:

1. An exhaust gas purification system of an internal combustion engine, comprising:
    an exhaust gas purification apparatus which is arranged in an exhaust passage of the internal combustion engine and which includes a selective catalytic reduction catalyst;
    an EGR apparatus which recirculates a part of exhaust gas flowing through the exhaust passage as EGR gas; and
    an electronic control unit configured to control an air-fuel ratio of an air-fuel mixture burned in the internal combustion engine and an amount of EGR gas recirculated by the EGR apparatus,
    wherein the electronic control unit is further configured to:
        when increasing a NO2 proportion that is a proportion of nitrogen dioxide in NOx contained in the exhaust gas, determine whether a temperature of the exhaust gas purification apparatus is higher than a predetermined temperature;
        when the temperature of the exhaust gas purification apparatus is higher than the predetermined temperature, increase the NO2 proportion by increasing the air-fuel ratio without increasing the amount of EGR gas; and
        when the temperature of the exhaust gas purification apparatus is lower than the predetermined temperature, increase the NO2 proportion by increasing the amount of EGR gas without increasing the air-fuel ratio,
    wherein the predetermined temperature is an upper limit value of a temperature purification window.

2. An exhaust gas purification system of an internal combustion engine, comprising:
    an exhaust gas purification apparatus which is arranged in an exhaust passage of the internal combustion engine and which includes a selective catalytic reduction catalyst;
    an EGR apparatus which recirculates a part of exhaust gas flowing through the exhaust passage as EGR gas;
    an electronic control unit configured to control an air-fuel ratio of an air-fuel mixture burned in the internal combustion engine and an amount of EGR gas recirculated from the exhaust passage to an intake passage of the internal combustion engine,
    wherein the electronic control unit is further configured to:
        when increasing a NO2 proportion that is a proportion of nitrogen dioxide in NOx contained in the exhaust gas, determine whether a temperature of the exhaust gas purification apparatus is higher than a predetermined temperature;

when the temperature of the exhaust gas purification apparatus is higher than the predetermined temperature, increase the NO2 proportion by increasing the air-fuel ratio without increasing the amount of EGR gas; and when the temperature of the exhaust gas purification apparatus is lower than the predetermined temperature, increase the NO2 proportion by increasing the amount of EGR gas, wherein the predetermined temperature is an upper limit value of a temperature purification window.

3. The exhaust gas purification system of an internal combustion engine according to claim 1, wherein the exhaust gas purification apparatus includes a three-way catalyst arranged on an upstream side of the selective catalytic reduction catalyst.

4. The exhaust gas purification system of an internal combustion engine according to claim 1, wherein the exhaust gas purification apparatus includes a NOx storage reduction catalyst arranged on an upstream side of the selective catalytic reduction catalyst.

* * * * *